No. 748,700. PATENTED JAN. 5, 1904.
W. D. CARSON.
MECHANISM FOR EXHIBITING ANIMALS.
APPLICATION FILED DEC. 1, 1902.
NO MODEL.
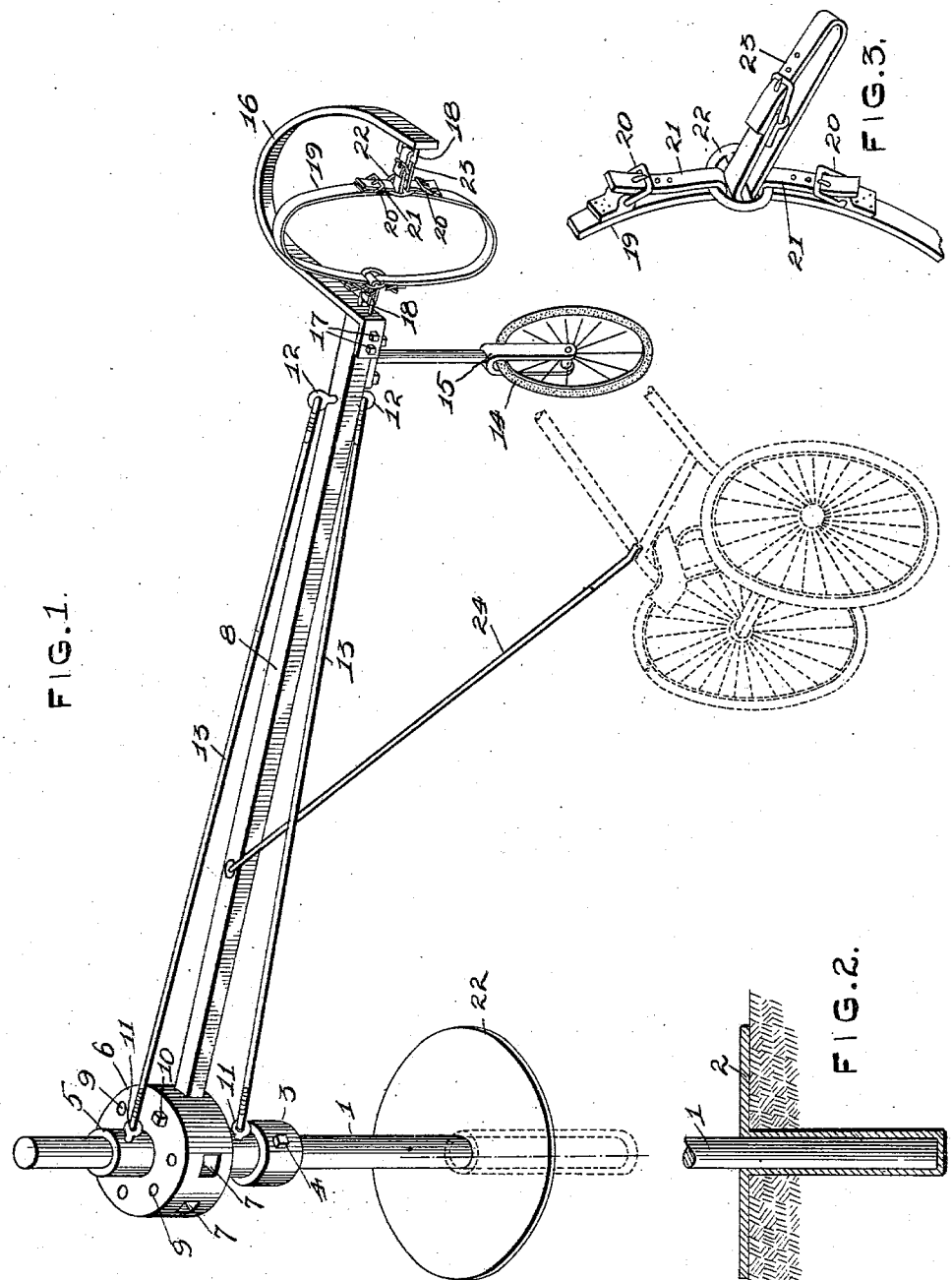
ATTEST
INVENTOR:—
Wm. D. CARSON.
BY Higdon & Longan
ATTYS.

No. 748,700. Patented January 5, 1904.

UNITED STATES PATENT OFFICE.

WILLIAM D. CARSON, OF CENTRALIA, ILLINOIS.

MECHANISM FOR EXHIBITING ANIMALS.

SPECIFICATION forming part of Letters Patent No. 748,700, dated January 5, 1904.

Application filed December 1, 1902. Serial No. 133,439. (No model.)

*To all whom it may concern:*

Be it known that I, WILLIAM D. CARSON, of the city of Centralia, Marion county, State of Illinois, have invented certain new and useful Improvements in Mechanism for Exhibiting Animals, of which the following is a full, clear, and exact description, reference being had to the accompanying drawings, forming a part hereof.

My invention relates to improvements in mechanism for exhibiting animals, and has for its object to provide means whereby animals, and particularly nervous, vicious, or unbroken animals, can be exhibited in the show-ring.

My invention consists in the peculiar construction and arrangement of parts hereinafter described and explained and will be more readily understood by reference to the following drawings, which form part of this specification, and in which—

Figure 1 is a perspective of a device embodying my invention. Fig. 2 is a vertical section of the base from which my mechanism operates, and Fig. 3 is a perspective of the girth attachment which I use for fastening the animal to the device.

The center pole 1 is held in position at the center of the show-ring by means of its insertion in the base-plate 2, which is shown in section in Fig. 2. The center pole 1 is provided with the adjustable collar 3, which completely encircles it and is fastened at any desirable height from the ground by means of the screw 4. Above the collar 3 I provide a revoluble collar 5, upon which is rigidly mounted the wheel 6, provided with the slots 7, which slots 7 are each adapted to receive and hold the inner extremity of a horizontal bar similar to the one shown and marked 8. The slots 7 are provided with the vertical openings 9, and the inner ends of the horizontal bars 8 are provided with corresponding openings, and the pins 10 are adapted to be fitted through the openings 9 and into the corresponding openings at the inner end of the horizontal bars in order to hold the latter firmly in position. As an additional means of securing the rigidity of the horizontal bars 8 I have provided the loops 11 on the sleeve 5 and the loops 12 at the outer ends of the horizontal bars 8 and have connected these loops by means of the bars 13.

As an additional safeguard against the destruction of my appliance by vicious animals I have provided the outer end of the horizontal bars 8 with the wheels 14, mounted in the forks 15. At the outer end of the horizontal bar 8 I have provided the breast-yoke 16, which is held in position by bolts 17 and is provided at the inner side of its rear extremity with the loops 18.

For the purpose of securing the animal in position I have provided the girth 19, having on each side the buckles 20 and straps 21, by which is held the link 22, which is connected with the loop 18 by means of the buckle-strap 23. When it is desired to exhibit animals in harness, a sulky or similar vehicle can be attached to the horizontal bar 8 in the position shown by the dotted lines in Fig. 1 by means of the strap 24. It is manifest that any number of the horizontal bars 8 may be fitted into the wheel 6, their number depending upon the diameter of the show-ring and the number of animals desired to be exhibited.

Having thus described my invention, what I claim as new, and desire to have secured to me by the grant of Letters Patent, is—

1. A device of the class named consisting of a center pole; a center plate adapted to receive the lower end of the center pole; an adjustable collar mounted on the center pole; a sleeve revolubly mounted on the center pole above the collar and provided with slots; a horizontal bar the inner end of which is adapted to fit into and be held by one of the slots; and provided at its outer extremity with a wheel, a breast-yoke and a girth; substantially as and for the purpose specified.

2. A device of the class named consisting of a center plate; a center pole mounted in the center plate and provided with an adjustable collar; a revoluble sleeve mounted on the center pole above the collar and provided with a slot adapted to receive the inner end of a horizontal bar; a horizontal bar supported at its outer end by a wheel provided with a breast-yoke and girth, and a strap whereby a vehicle may be attached to the horizontal bar; substantially as and for the purpose as specified.

In testimony whereof I affix my signature in presence of two witnesses.

WILLIAM D. CARSON.

Witnesses:
  J. B. CHAMBERS,
  S. L. BALTZELL.